(12) United States Patent
Huang et al.

(10) Patent No.: US 11,245,284 B2
(45) Date of Patent: Feb. 8, 2022

(54) POWER ALLOCATION OF MULTI-PARALLEL POWER ELECTRONIC TRANSFORMERS

(71) Applicant: GUANGZHOU INSTITUTE OF ENERGY CONVERSION, CHINESE ACADEMY OF SCIENCES, Guangzhou (CN)

(72) Inventors: Lei Huang, Guangzhou (CN); Jie Shu, Guangzhou (CN); Qiong Cui, Guangzhou (CN); Jiyuan Zhang, Guangzhou (CN); Hao Wang, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 301 days.

(21) Appl. No.: 16/620,892

(22) PCT Filed: Oct. 9, 2018

(86) PCT No.: PCT/CN2018/109389
§ 371 (c)(1),
(2) Date: Dec. 10, 2019

(87) PCT Pub. No.: WO2019/233003
PCT Pub. Date: Dec. 12, 2019

(65) Prior Publication Data
US 2021/0359541 A1   Nov. 18, 2021

(30) Foreign Application Priority Data
Jul. 3, 2018   (CN) .......................... 201810718649.5

(51) Int. Cl.
H02J 13/00   (2006.01)
G05B 13/04   (2006.01)

(52) U.S. Cl.
CPC ...... H02J 13/00002 (2020.01); G05B 13/042 (2013.01); *H02J 2203/20* (2020.01)

(58) Field of Classification Search
None
See application file for complete search history.

(56) References Cited

U.S. PATENT DOCUMENTS 6,388,898 B1 * 5/2002 Fan ................... H02M 3/33561
                                                                363/17
7,072,190 B2 * 7/2006 Schlecht ............. H02M 3/3374
(Continued)

FOREIGN PATENT DOCUMENTS

CN   104882885 A   9/2015
CN   106099972 A   11/2016
(Continued)

OTHER PUBLICATIONS

Krishnaswami et al., "Three-Port Series-Resonant DC-DC Converter to Interface Renewable Energy Sources With Bidirectional Load and Energy Storage Ports", Dec. 11, 2008, IEEE Transactions on Power Electronics, vol. 24, No. 10, Oct. 2009. (Year: 2008).*
(Continued)

*Primary Examiner* — Mohammad Ali
*Assistant Examiner* — Kelvin Booker
(74) *Attorney, Agent, or Firm* — Bayramoglu Law Offices LLC (57) ABSTRACT

A method and an electronic device for power allocation of multi-parallel power electronic transformers, the method including: determining a quantity of conversion stages of the power electronic transformers; obtaining a load ratio-efficiency relationship between the two ports of each conver-
(Continued)

sion stage in turn, performing a curve fitting to obtain a load ratio-efficiency curve of each conversion stage of the power electronic transformers; calculating a load ratio-loss relationship of each conversion stage, based on the load ratio-efficiency curve of each conversion stage; obtaining a multi-parallel minimum-operation-loss power allocation curve of each conversion stage; performing a piecewise curve fitting of the minimum-operation-loss power allocation curve to obtain a multi-parallel optimum power allocation mathematical model of each stage; and determining an optimum power allocation to each port of the multi-parallel power electronic transformers, based on the multi-parallel optimum power allocation mathematical model of each stage.

12 Claims, 7 Drawing Sheets

(56) References Cited

U.S. PATENT DOCUMENTS

| | | | |
|---|---|---|---|
| 7,362,009 B2* | 4/2008 | Chen | H02J 1/10 |
| | | | 307/87 |
| 7,898,236 B2* | 3/2011 | Houston | H02M 3/1584 |
| | | | 323/284 |
| 8,963,521 B2* | 2/2015 | Wei | H02M 3/1584 |
| | | | 323/272 |
| 2004/0174147 A1* | 9/2004 | Vinciarelli | H02M 3/337 |
| | | | 323/266 |
| 2013/0070490 A1 | 3/2013 | Liu et al. | |

FOREIGN PATENT DOCUMENTS

| | | |
|---|---|---|
| CN | 106712107 A | 5/2017 |
| CN | 107508311 A | 12/2017 |
| CN | 107994562 A | 5/2018 |

OTHER PUBLICATIONS

Liu et al., "Parallel Operation of Electronic Power Transformer and Conventional Transformer", DRPT2008 Apr. 6-9, 2008 Nanjing China. (Year: 2008).*

Wu et al., "An Interleaved Half-Bridge Three-Port Converter With Enhanced Power Transfer Capability Using Three-Leg Rectifier for Renewable Energy Applications", Apr. 14, 2015, IEEE Journal of Emerging and Selected Topics in Power Electronics, vol. 04, No. 2, Jun. 2016. (Year: 2015).*

Zhang et al., "Energy Management of PV-diesel-battery Hybrid Power System for Island Stand-alone Micro-grid", Energy Procedia 105 (2017) 2201-2206. (Year: 2017).*

* cited by examiner

POWER ALLOCATION OF MULTI-PARALLEL POWER ELECTRONIC TRANSFORMERS

CROSS REFERENCE TO THE RELATED APPLICATIONS

This application is the national phase entry of International Application No. PCT/CN2018/109389, filed on Oct. 9, 2018, which is based upon and claims priority to Chinese Patent Application No. 201810718649.5, filed on Jul. 3, 2018, the entire contents of which are incorporated herein by reference.

TECHNICAL FIELD

The present invention relates to the technical field of power electronic transformer, and particularly relates to a method and an electronic device for power allocation of multi-parallel power electronic transformers.

BACKGROUND

With the rapidly growing proportion of generalized DC powered devices and the rapid development of DC-type distributed energy resources, many problems rise in the traditional AC distribution network when integrating DC loads and DC power supplies, such as more conversion stages, high loss, and poor flexibility, and thus there is an urgent need to develop medium and low voltage DC power distribution technology. Since AC powered devices remains the major electric devices at present, it is necessary to employing hybrid AC/DC power technology to solve the problems of increasing DC devices.

Generally at present, a power electronic transformer is employed to step down voltage from a medium voltage AC grid to a low voltage AC grid, and then a dual-port converter is employed for rectification to obtain a low-voltage direct current. In view of the development trend that the integration of distributed energy resources into power system causes power flows of multiple directions, multi-port power electronic transformers may be employed as energy routers to realize flexible interconnections and multi-directional power flows in the medium and low voltage AC/DC networks. However, existing electronic transformers are unable to provide optimum power allocation, resulting in low allocation efficiency.

SUMMARY

In order to solve the above problem, the present invention provides a method and an electronic device for power allocation of multi-parallel power electronic transformers. By using of the characteristic of power electronic transformers that the port power is flexibly controllable, the present invention optimizes the port power allocation among multiple power electronic transformers, improves the cost-effectiveness of multi-parallel operation of multi-port power electronic transformers, and reduces the energy loss of the AC/DC hybrid system.

The present invention provides a method for power allocation of multi-parallel power electronic transformers, which comprises:

determining a quantity of conversion stages of the multi-parallel power electronic transformers, wherein each of the conversion stages comprises two ports;

obtaining a load ratio-efficiency relationship between the two ports of each conversion stage in turn, performing a curve fitting to obtain a load ratio-efficiency curve of each conversion stage of the multi-parallel power electronic transformers;

calculating a load ratio-loss relationship of each conversion stage, based on the load ratio-efficiency curve of each conversion stage;

obtaining a multi-parallel minimum-operation-loss power allocation curve of each conversion stage, based on the load ratio-loss relationship of each conversion stage;

performing a piecewise curve fitting of the minimum-operation-loss power allocation curve to obtain a multi-parallel optimum power allocation mathematical model of each stage; and determining an optimum power allocation to each port of the multi-parallel power electronic transformers, based on the multi-parallel optimum power allocation mathematical model of each stage.

Furthermore, the step of obtaining the multi-parallel minimum-operation-loss power allocation curve of each conversion stage based on the load ratio-loss relationship of each conversion stage, comprises:

using the grid method to calculate total losses of each stage of the power electronic transformers in a multi-parallel operation under different loads; and selecting a plurality of specific loads, determining minimum total losses of each stage in the multi-parallel operation under the specific loads, calculating an optimum power allocation of each stage in the multi-parallel operation within a load range thereof to obtain the multi-parallel minimum-operation-loss power allocation curve of each stage.

Furthermore, the multi-parallel optimum power allocation mathematical model is a dual-parallel optimum power allocation mathematical model, wherein the step of performing the piecewise curve fitting of the minimum-operation-loss power allocation curve to obtain the multi-parallel optimum power allocation mathematical model of each stage, comprises:

dividing the minimum-operation-loss power allocation curve of each stage in the multi-parallel configuration into a first curve segment, a second curve segment, a third curve segment, a fourth curve segment, and a fifth curve segment, wherein the first curve segment includes two apposed curve segments ranging from a minimum load to a first load jump point, the first jump point is a load point corresponding to an end of the apposed curve segments, the second curve segment includes a first connecting curve segment ranging from the first load jump point to a second load jump point, the second load jump point is a load point corresponding to a junction of the first connecting curve segment and an upper segment of an annular curve segment, the third curve segment includes the upper segment of the annular curve segment ranging from the second load jump point to a third load jump point, the third load jump point is a load point of the annular curve segment corresponding to a maximum x-value of a projection curve of the annular curve segment on a projection plane, an x-axis of the projection plane represents a power of one power electronic transformer, a y-axis of the projection plane represents a power of the other power electronic transformer, the fourth curve segment includes a lower segment of the annular curve segment ranging from the third load jump point to a fourth load jump point, the fourth load point is a load point corresponding to a junction of the lower segment of the annular curve segment and a second connecting curve segment, and the fifth curve segment includes the second connecting curve segment ranging from the fourth load point to a maximum load, and performing a curve fitting of a projection curve of the third curve segment on the projection plane and a projection curve of the fourth curve segment on the projection plane; and constructing the multi-parallel optimum power allocation mathematical model for each stage in two parallel power electronic transformers.

Furthermore, the step of constructing the multi-parallel optimum power allocation mathematical model for each stage in the two parallel power electronic transformers, comprises:

constructing the multi-parallel optimum power allocation mathematical model for each stage in the two parallel power electronic transformers as follows:

when a total load x of the two parallel power electronic transformers is between the minimum load and the first load jump point LA, operating only one of the two power electronic transformers, and shutting down the other one; when the total load x of the two parallel power electronic transformers is between the first load jump point LA and the second load jump point LB, evenly allocating power to the two power electronic transformers; when the total load x of the two parallel power electronic transformers is between the second load jump point LB and the third load jump point LC, allocating power f1(x) to one power electronic transformer wherein f1(x) is a fitted polynomial function, and allocating power x-f1(x) to the other power electronic transformer; when the total load x of the two parallel power electronic transformers is between the third load jump point LC and the fourth load jump point LD, allocating power f2(x) to one power electronic transformer wherein f2(x) is a fitted polynomial function, and allocating power x-f2(x) to the other power electronic transformer; and when the total load x of the two parallel power electronic transformers is between the fourth load jump point LD and the maximum load LMAX, evenly allocating power to the two power electronic transformers, wherein LMAX represents a maximum operation power of each stage in the two parallel power electronic transformers.

Furthermore, the step of determining the optimum power allocation to each port of the multi-parallel power electronic transformers based on the multi-parallel optimum power allocation mathematical model of each stage, comprises:

determining the optimum power allocation to each port of multi-parallel multi-port power electronic transformers in a sequence starting from a low-voltage bus, based on the multi-parallel optimum power allocation mathematical model of each stage.

The present invention provides an electronic device for power allocation of multi-parallel power electronic transformers, which comprises:

at least one processor, and a memory communicatively connected to the at least one processor, wherein, the memory stores instructions executable by the one processor, the instructions being executed by the at least one processor to enable the at least one processor to perform the following steps:

determining a quantity of conversion stages of the multi-parallel power electronic transformers, wherein each of the conversion stages comprises two ports;

obtaining a load ratio-efficiency relationship between the two ports of each conversion stage in turn, performing a curve fitting to obtain a load ratio-efficiency curve of each conversion stage of the multi-parallel power electronic transformers;

calculating a load ratio-loss relationship of each conversion stage, based on the load ratio-efficiency curve of each conversion stage;

obtaining a multi-parallel minimum-operation-loss power allocation curve of each conversion stage, based on the load ratio-loss relationship of each conversion stage;

performing a piecewise curve fitting of the minimum-operation-loss power allocation curve to obtain a multi-parallel optimum power allocation mathematical model of each stage; and determining an optimum power allocation to each port of the multi-parallel power electronic transformers, based on the multi-parallel optimum power allocation mathematical model of each stage.

Furthermore, the step of obtaining the multi-parallel minimum-operation-loss power allocation curve of each conversion stage based on the load ratio-loss relationship of each conversion stage, comprises:

using the grid method to calculate total losses of each stage of the power electronic transformers in a multi-parallel operation under different loads; and selecting a plurality of specific loads, determining minimum total losses of each stage in the multi-parallel operation under the specific loads, calculating an optimum power allocation of each stage in the multi-parallel operation within a load range thereof to obtain the multi-parallel minimum-operation-loss power allocation curve of each stage.

Furthermore, the multi-parallel optimum power allocation mathematical model is a dual-parallel optimum power allocation mathematical model, wherein the step of performing the piecewise curve fitting of the minimum-operation-loss power allocation curve to obtain the multi-parallel optimum power allocation mathematical model of each stage, comprises:

dividing the minimum-operation-loss power allocation curve of each stage in the multi-parallel configuration into a first curve segment, a second curve segment, a third curve segment, a fourth curve segment, and a fifth curve segment, wherein the first curve segment includes two apposed curve segments ranging from a minimum load to a first load jump point, the first jump point is a load point corresponding to an end of the apposed curve segments, the second curve segment includes a first connecting curve segment ranging from the first load jump point to a second load jump point, the second load jump point is a load point corresponding to a junction of the first connecting curve segment and an upper segment of an annular curve segment, the third curve segment includes the upper segment of the annular curve segment ranging from the second load jump point to a third load jump point, the third load jump point is a load point of the annular curve segment corresponding to a maximum x-value of a projection curve of the annular curve segment on a projection plane, an x-axis of the projection plane represents a power of one power electronic transformer, a y-axis of the projection plane represents a power of the other power electronic transformer, the fourth curve segment includes a lower segment of the annular curve segment ranging from the third load jump point to a fourth load jump point, the fourth load point is a load point corresponding to a junction of the lower segment of the annular curve segment and a second connecting curve segment, and the fifth curve segment includes the second connecting curve segment ranging from the fourth load point to a maximum load, and performing a curve fitting of a projection curve of the third curve segment on the projection plane and a projection curve of the fourth curve segment on the projection plane; and constructing the multi-parallel optimum power allocation mathematical model for each stage in two parallel power electronic transformers.

Furthermore, the step of constructing the multi-parallel optimum power allocation mathematical model for each stage in the two parallel power electronic transformers, comprises:

constructing the multi-parallel optimum power allocation mathematical model for each stage in the two parallel power electronic transformers as follows:

when a total load x of the two parallel power electronic transformers is between the minimum load and the first load jump point LA, operating only one of the two power electronic transformers, and shutting down the other one; when the total load x of the two parallel power electronic transformers is between the first load jump point LA and the second load jump point LB, evenly allocating power to the two power electronic transformers; when the total load x of the two parallel power electronic transformers is between the second load jump point LB and the third load jump point LC, allocating power f1(x) to one power electronic transformer wherein f1(x) is a fitted polynomial function, and allocating power x-f1(x) to the other power electronic transformer; when the total load x of the two parallel power electronic transformers is between the third load jump point LC and the fourth load jump point LD, allocating power f2(x) to one power electronic transformer wherein f2(x) is a fitted polynomial function, and allocating power x-f2(x) to the other power electronic transformer; and when the total load x of the two parallel power electronic transformers is between the fourth load jump point LD and the maximum load LMAX, evenly allocating power to the two power electronic transformers, wherein LMAX represents a maximum operation power of each stage in the two parallel power electronic transformers.

Furthermore, the step of determining the optimum power allocation to each port of the multi-parallel power electronic transformers based on the multi-parallel optimum power allocation mathematical model of each stage, comprises:

determining the optimum power allocation to each port of multi-parallel multi-port power electronic transformers in a sequence starting from a low-voltage bus, based on the multi-parallel optimum power allocation mathematical model of each stage.

Compared with the prior art, the present invention has the following benefits.

1. The present invention solves the power allocation optimization problem of the multi-parallel operation of multi-port power electronic transformers, reduces the energy loss of the multi-parallel system, and improves the system efficiency.

2. In the present invention, an offline optimization calculation is employed, wherein the mathematical relationship between the load and the power allocation of each stage of each power electronic transformer is obtained offline using the grid method and the piecewise curve fitting method, and the power allocation results can be rapidly calculated by substituting load values into the mathematical relationship.

3. In the present invention, a power electronic transformer is divided into multiple conversion stages, wherein the optimum power allocation to each stage is calculated separately, and the optimum power allocation to each port is determined stage by stage, so as to eliminate the influence of the multiple flow directions of the ports and the efficiency correlation between the ports on the optimum power allocation of the power electronic transformer, and reduces the complexity of simultaneously solving the optimum power allocations to multiple ports of the power electronic transformer.

DETAILED DESCRIPTION OF THE EMBODIMENTS

The present invention will be further described in detail below with the drawings and specific embodiments.

Figure 1:
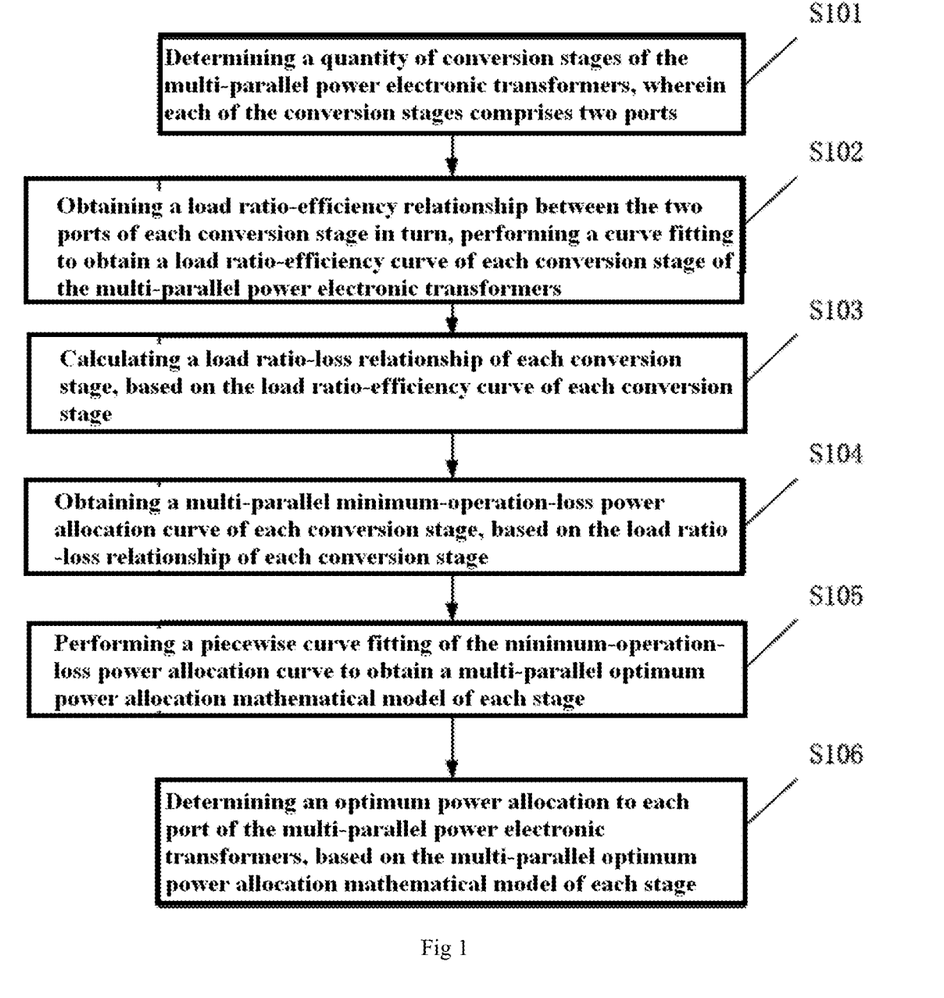
FIG. 1 shows a flow chart of the method for power allocation of multi-parallel power electronic transformers in the present invention.

FIG. 1 is a flow chart of the method for power allocation of multi-parallel power electronic transformers, comprising:

step S101: determining a quantity of conversion stages of the multi-parallel power electronic transformers, wherein each of the conversion stages comprises two ports;

step S102: obtaining a load ratio-efficiency relationship between the two ports of each conversion stage in turn, performing a curve fitting to obtain a load ratio-efficiency curve of each conversion stage of the multi-parallel power electronic transformers;

step S103: calculating a load ratio-loss relationship of each conversion stage, based on the load ratio-efficiency curve of each conversion stage;

step S104: obtaining a multi-parallel minimum-operation-loss power allocation curve of each conversion stage, based on the load ratio-loss relationship of each conversion stage;

step S105: performing a piecewise curve fitting of the minimum-operation-loss power allocation curve to obtain a multi-parallel optimum power allocation mathematical model of each stage;

step S106: determining an optimum power allocation to each port of the multi-parallel power electronic transformers, based on the multi-parallel optimum power allocation mathematical model of each stage.

Specifically, in step S101, the connection relationship between the ports are determined according to the topology of the power electronic transformers, and a conversion stage is defined to be a section between two ports which have the closest electrical connection, wherein the relationship of N (the quantity of the conversion stages) and M (the quantity of the ports) is: M−1=N.

Figure 3A:
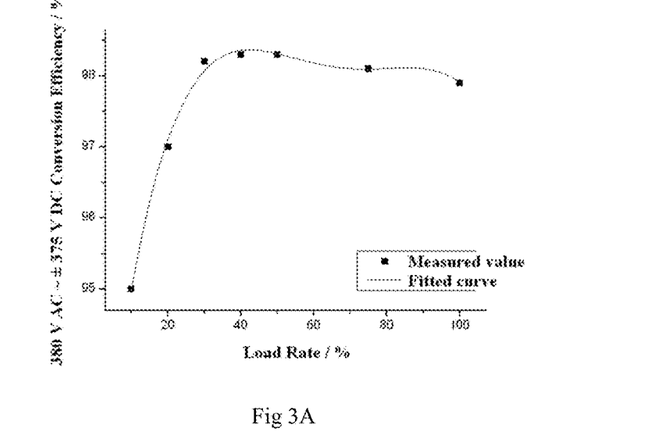
FIGS. 3A, 3B and 3C show the load ratio-efficiency curve of each stage of a power electronic transformer in one embodiment of the present invention.
Figure 3B:
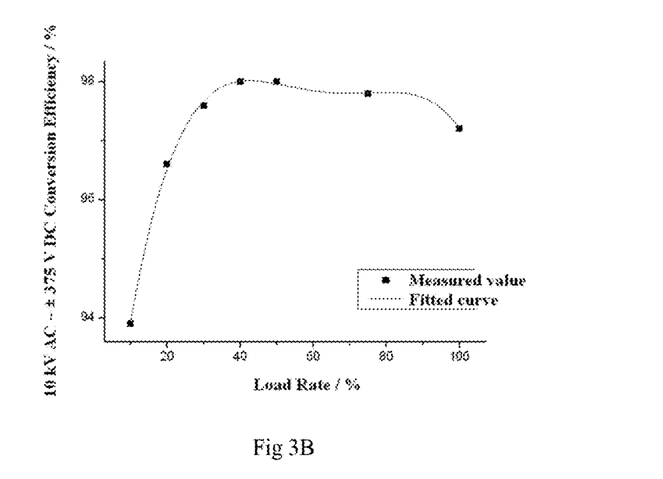
Figure 3C:
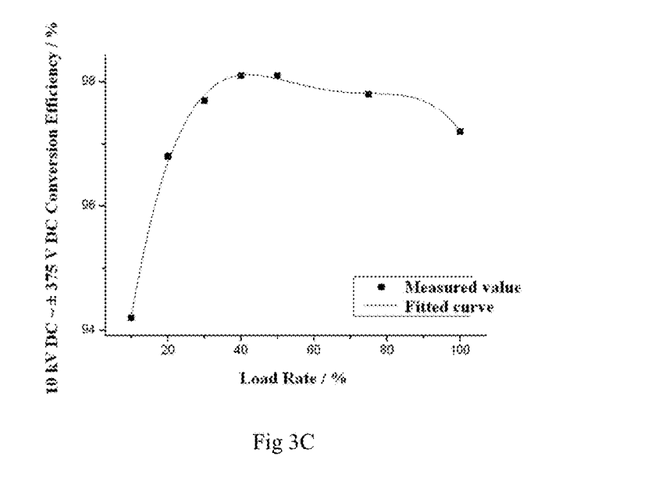

Next, in step S102, the load ratio-efficiency relationship between the two ports of each conversion stage is measured according to the stage division inside the power electronic transformer, wherein the load ratio-efficiency relationship of each conversion stage inside the power electronic transformer is provided by the manufacturer, and other ports are shut down when the measurement is performed. The measurement of load ratio-efficiency relationship requires the efficiency data corresponding to at least seven different load ratio values, wherein five of them correspond to a 50% load ratio or below, including an efficiency data corresponding to a 10% load ratio, and two of them correspond to the load ratio above 50%, including an efficiency data corresponding to a 100% load ratio. In order to obtain a more accurate load ratio-efficiency relationship, more data points may be introduced in the measurement. As shown in FIGS. 3A, 3B and 3C, the efficiency date ranging from the minimum load ratio to the 100% load ratio is obtained by performing a curve fitting of the load ratio and efficiency data.

Figure 4A:
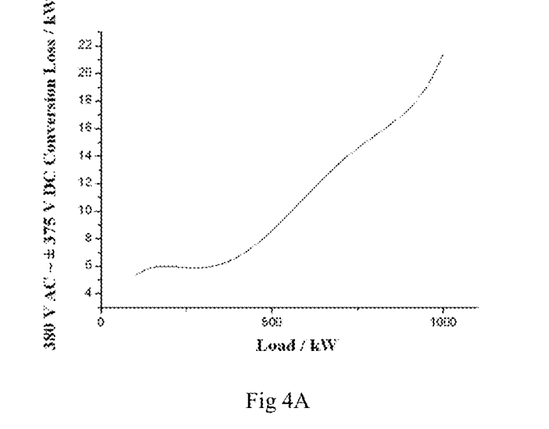
FIGS. 4A, 4B and 4C show the load ratio-loss relationship of each stage of a power electronic transformer in one embodiment of the present invention.
Figure 4B:
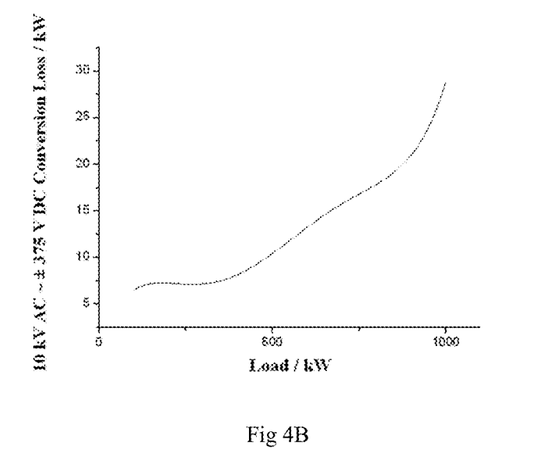
Figure 4C:
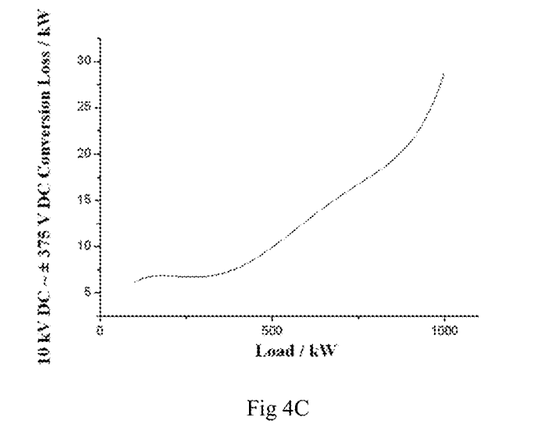

As shown in FIGS. 3A, 3B and 3C, in step S103, the load ratio-loss relationship of each conversion stage is calculated based on the load ratio-efficiency relationship of each conversion stage. As shown in FIGS. 4A, 4B and 4C, the loss data of each stage at 10% to 100% load ratios are obtained.

Figure 5A:
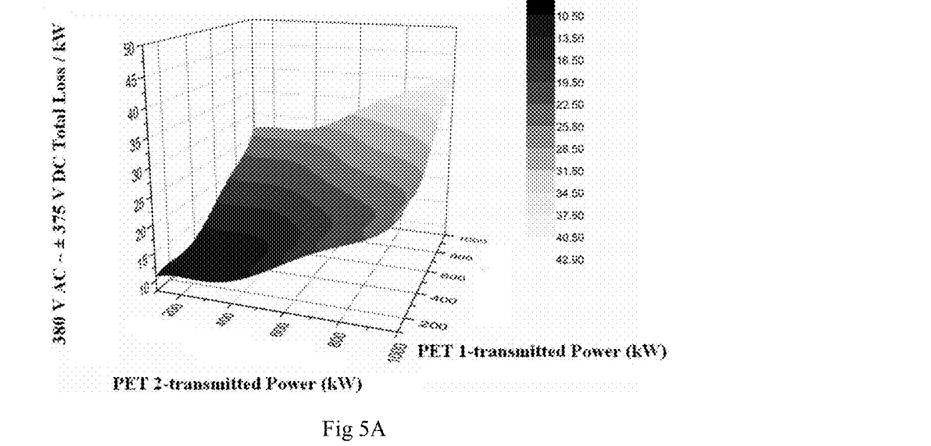
FIGS. 5A, 5B and 5C show the dual-parallel total loss of each stage of the power electronic transformers in one embodiment of the present invention.
Figure 5B:
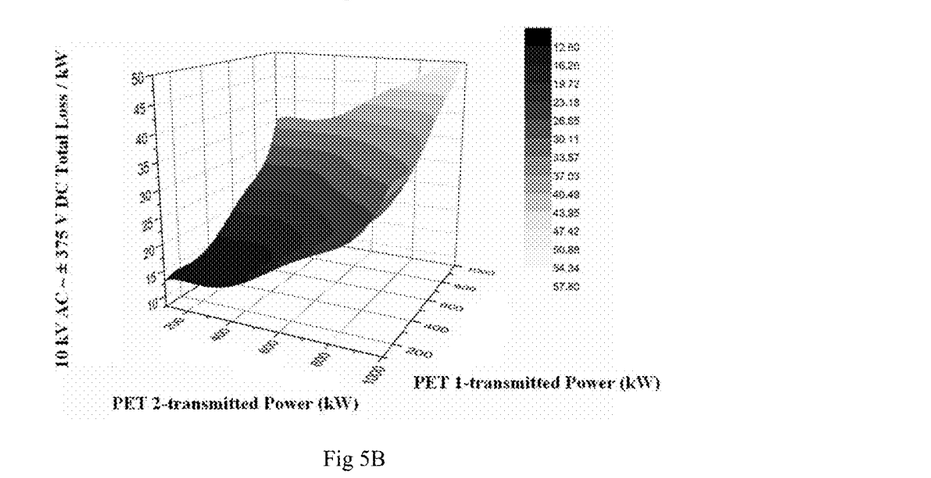
Figure 5C:
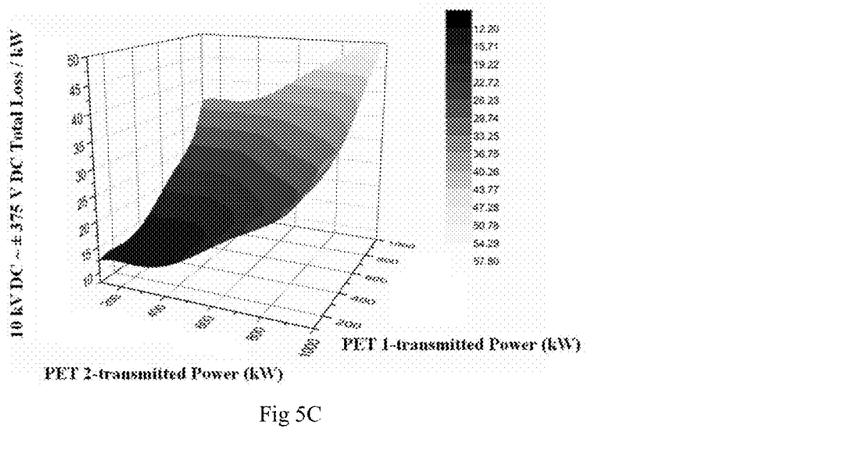

Next, in step S104, the grid method is employed to calculate total losses of each stage of the power electronic transformer in a multi-parallel operation under different loads; then, the minimum total losses of each stage in the multi-parallel operation under the specific loads are determined, the optimum power allocation of each stage in the multi-parallel operation within a load range thereof is calculated to obtain the multi-parallel minimum-operation-loss power allocation curve of each stage, as shown in FIGS. 5A, 5B and 5C. In the same way, the multi-parallel minimum-operation-loss power allocation curves of all stages are calculated.

In one embodiment, the step of obtaining the multi-parallel minimum-operation-loss power allocation curve of each conversion stage based on the load ratio-loss relationship of each conversion stage, comprises:

using the grid method to calculate the total losses of each stage of the power electronic transformers in a multi-parallel operation under different loads;

selecting a plurality of specific loads, determining minimum total losses of each stage in the multi-parallel operation under the specific loads, calculating the optimum power allocation of each stage in the multi-parallel operation within a load range thereof to obtain the multi-parallel minimum-operation-loss power allocation curve of each stage.

With regard to obtaining the multi-parallel minimum-operation-loss power allocation curve of each conversion stage, changes in the efficiency, capacity and number of the power electronic transformers in the parallel operation, will result in different power allocation and different piecewise points in the minimum-loss curve for each stage, and thus it is necessary to determine the piecewise points according to the specific power electronic transformers and their parallel configuration. The basis for defining the minimum-loss curve in a piecewise way is that the power allocation varies, in the projection of the three-dimensional curve on the X-Y plane, usually including: single transformer operation, multiple transformers operation with equally allocated power, and power represented by an n-order polynomial function (n>3). With the multi-parallel minimum-operation-loss power allocation curve wherein the total load corresponding to the stage is defined as x and the power allocation result is defined as y, a curve fitting is performed to obtain a piecewise function y=f(x) and thereby the multi-parallel optimum power allocation mathematical model in step S105.

Figure 6A:
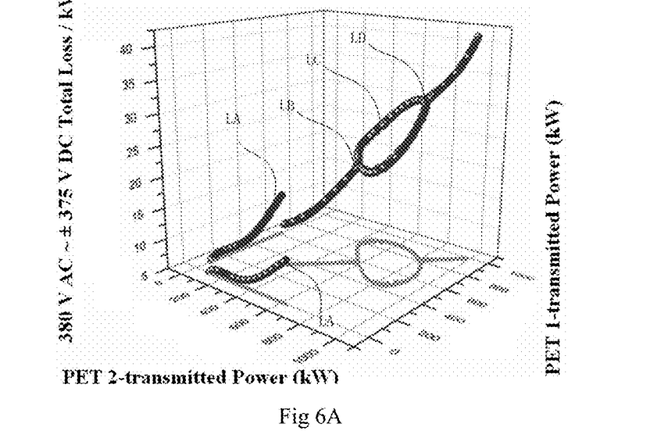
FIGS. 6A, 6B and 6C show the dual-parallel minimum-operation-loss power allocation curve of each stage of the power electronic transformers in one embodiment of the present invention.
Figure 6B:
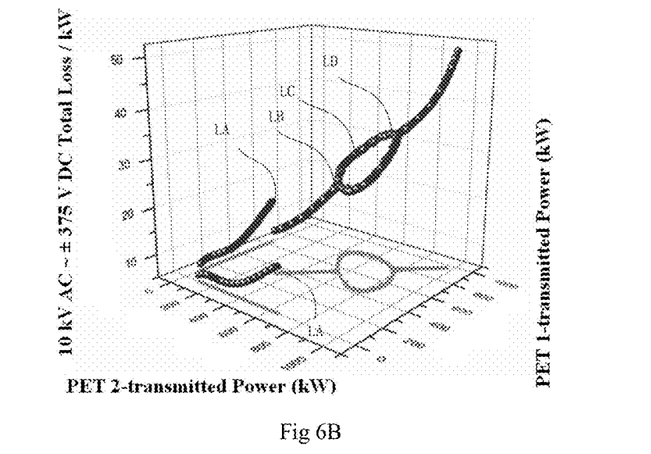
Figure 6C:
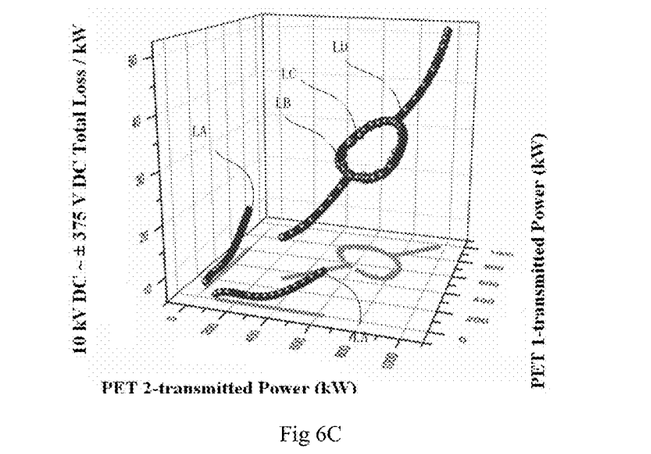

In one embodiment, as shown in FIGS. 6A, 6B and 6C, the multi-parallel optimum power allocation mathematical model is a dual-parallel optimum power allocation mathematical model, wherein the step of performing the piecewise curve fitting of the minimum-operation-loss power allocation curve to obtain the multi-parallel optimum power allocation mathematical model of each stage, comprises:

dividing the minimum-operation-loss power allocation curve of each stage in the multi-parallel configuration into a first curve segment, a second curve segment, a third curve segment, a fourth curve segment, and a fifth curve segment, wherein the first curve segment includes two apposed curve segments ranging from a minimum load to a first load jump point, the first jump point is a load point corresponding to an end of the apposed curve segments, the second curve segment includes a first connecting curve segment ranging from the first load jump point to a second load jump point, the second load jump point is a load point corresponding to a junction of the first connecting curve segment and an upper segment of an annular curve segment, the third curve segment includes the upper segment of the annular curve segment ranging from the second load jump point to a third load jump point, the third load jump point is a load point of the annular curve segment corresponding to a maximum x-value of a projection curve of the annular curve segment on a projection plane, the x-axis of the projection plane represents a power of one power electronic transformer, the y-axis of the projection plane represents a power of the other power electronic transformer, the fourth curve segment includes a lower segment of the annular curve segment ranging from the third load jump point to a fourth load jump point, the fourth load point is a load point corresponding to a junction of the lower segment of the annular curve segment and a second connecting curve segment, and the fifth curve segment includes the second connecting curve segment ranging from the fourth load point to a maximum load, and performing a curve fitting of a projection curve of the third curve segment on the projection plane and a projection curve of the fourth curve segment on the projection plane;

constructing the multi-parallel optimum power allocation mathematical model for each stage in two parallel power electronic transformers.

In one embodiment, the step of constructing the multi-parallel optimum power allocation mathematical model for each stage in the two parallel power electronic transformers, comprises:

constructing the multi-parallel optimum power allocation mathematical model for each stage in the two parallel power electronic transformers as follows:

when a total load x of the two parallel power electronic transformers is between the minimum load and the first load jump point LA, operating only one of the two power electronic transformers, and shutting down the other one; when the total load x of the two parallel power electronic transformers is between the first load jump point LA and the second load jump point LB, evenly allocating power to the two power electronic transformers; when the total load x of the two parallel power electronic transformers is between the second load jump point LB and the third load jump point LC, allocating power f1(x) to one power electronic transformer wherein f1(x) is a fitted polynomial function, and allocating power x−f1(x) to the other power electronic transformer; when the total load x of the two parallel power electronic transformers is between the third load jump point LC and the fourth load jump point LD, allocating power f2(x) to one power electronic transformer wherein f2(x) is a fitted polynomial function, and allocating power x−f2(x) to the other power electronic transformer; and when the total load x of the two parallel power electronic transformers is between the fourth load jump point LD and the maximum load LMAX, evenly allocating power to the two power electronic transformers, wherein LMAX represents an maximum operation power of each stage in the two parallel power electronic transformers.

Lastly, the step S106, determining the optimum power allocation to each port of the multi-parallel power electronic transformers, based on the multi-parallel optimum power allocation mathematical model of each stage.

In one embodiment, the step of determining the optimum power allocation to each port of the multi-parallel power electronic transformers based on the multi-parallel optimum power allocation mathematical model of each stage, comprises:

determining the optimum power allocation to each port of multi-parallel multi-port power electronic transformers in a sequence starting from the low-voltage bus, based on the multi-parallel optimum power allocation mathematical model of each stage.

Specifically, the optimum power allocation to each stage of each multi-parallel multi-port power electronic transformers, stage by stage in a sequence starting from the low-voltage bus, may be determined based on the actual load and the configuration of distributed energy resources, so as to obtain an optimized power allocation of the multi-parallel multi-port power electronic transformers.

Compared with the prior art, the present invention has the following benefits.

1. The present invention solves the power allocation optimization problem of the multi-parallel operation of multi-port power electronic transformers, reduces the energy loss of the multi-parallel system, and improves the system efficiency.

2. In the present invention, an offline optimization calculation is employed, wherein the mathematical relationship between the load and the power allocation of each stage of each power electronic transformer is obtained offline using the grid method and the piecewise curve fitting method, and the power allocation results can be rapidly calculated by substituting load values into the mathematical relationship.

3. In the present invention, a power electronic transformer is divided into multiple conversion stages, wherein the optimum power allocation to each stage is calculated separately, and the optimum power allocation to each port is determined stage by stage, so as to eliminate the influence of the multiple flow directions of the ports and the efficiency correlation between the ports on the optimum power allocation of the power electronic transformer, and reduces the complexity of simultaneously solving the optimum power allocations to multiple ports of the power electronic transformer.

Figure 9:
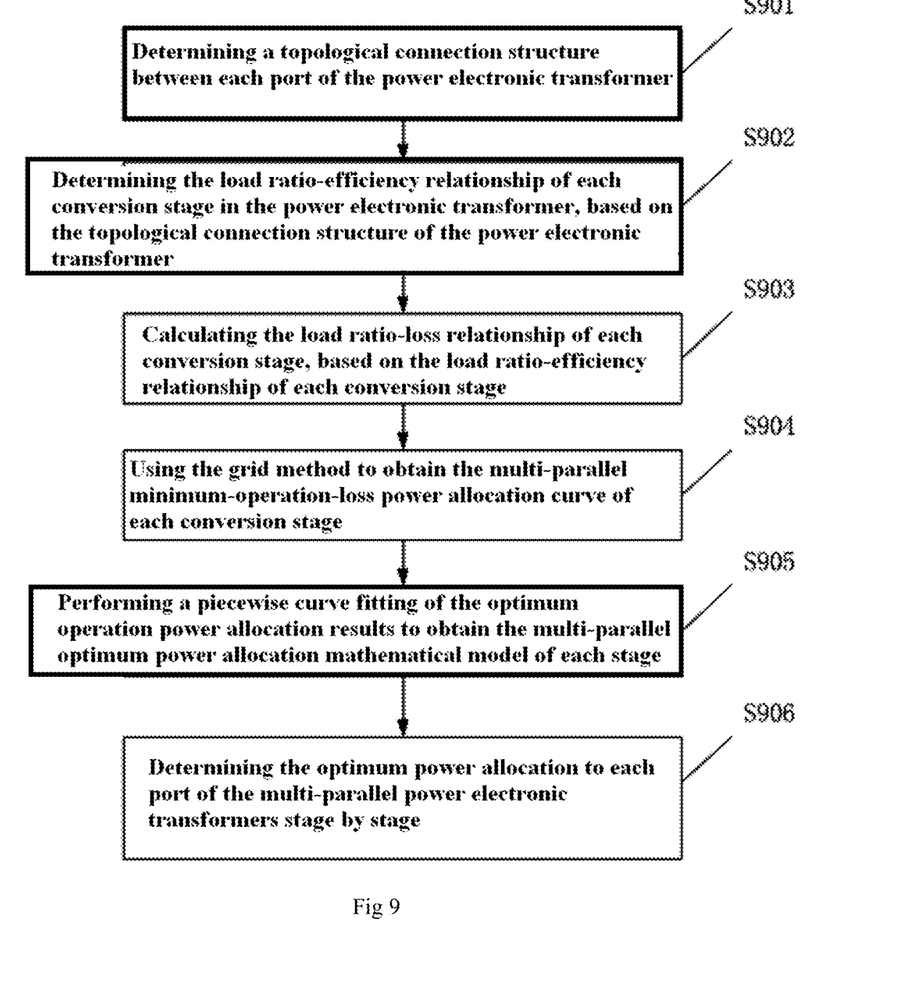
FIG. 9 shows a flow chart of one preferred embodiment of the present invention.

FIG. 9 is a flow chart of one preferred embodiment of the present invention, the process comprising:

step S901: determining a topological connection structure between each port of the power electronic transformer;

step S902: determining the load ratio-efficiency relationship of each conversion stage in the power electronic transformer, based on the topological connection structure of the power electronic transformer;

step S903: calculating the load ratio-loss relationship of each conversion stage, based on the load ratio-efficiency relationship of each conversion stage;

step S904: using the grid method to obtain the multi-parallel minimum-operation-loss power allocation curve of each conversion stage;

step S905: performing a piecewise curve fitting of the optimum operation power allocation results to obtain the multi-parallel optimum power allocation mathematical model of each stage;

step S906: determining the optimum power allocation to each port of the multi-parallel power electronic transformers stage by stage.

Figure 2:
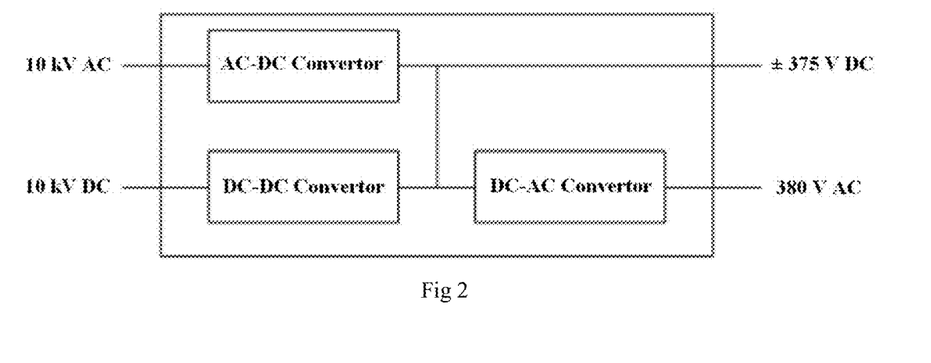
FIG. 2 shows the internal structure of a power electronic transformer in one embodiment of the present invention.

In order to better describe the specific implementation steps of the present invention, an embodiment of the above method is as follows:

(1) Determining the internal connection structure of a four-port power electronic transformer, as shown in FIG. 2. A section between two ports which have the closest electrical connection is defined as a conversion stage, and thereby the power electronic transformer can be divided into three conversion stages, which are respectively 10 kV AC~±375 V DC, 10 kV DC~±375 V DC, and 380 V AC~±375 V DC.

(2) Determining the load ratio-efficiency relationship between the ports of the three conversion stages in the power electronic transformer, wherein seven data points are assigned for each stage, including 10%, 20%, 30%, 40%, 50%, 75% and 100% load ratios and the efficiency corresponding thereto. Performing a curve fitting of the load ratio-efficiency data of the three stages, as shown in FIGS. 3A, 3B and 3C, to obtain the efficiency data at load ratios 10% to 100%.

(3) As shown in FIGS. 4A, 4B and 4C, calculating the load ratio-loss relationship of the three conversion stages, based on the load ratio-efficiency relationship of the three conversion stages, so as to obtain the loss data of the three stages at load ratios 10% to 100%.

(4) Using the grid method to obtain the dual-parallel minimum-operation-loss power allocation curves of the three conversion stages. The dual-parallel minimum-operation-loss power allocation curve of each stage is calculated by: first, using the grid method to calculate the total losses of each stage of the power electronic transformer (PET) at different loads in the dual-parallel operation, as shown in FIGS. 5A, 5B and 5C; next, calculating the dual-parallel minimum total losses of each stage at the specific loads, and calculating the optimum operation power allocation at the load range thereof so as to obtain the dual-parallel minimum-operation-loss power allocation curve of each stage, as shown in FIGS. 6A, 6B and 6C.

(5) Constructing a multi-parallel optimum power allocation mathematical model of each stage. As the three stages have similar dual-parallel minimum-operation-loss power allocation curves, all of them are divided into five segments. Taking the dual-parallel minimum-operation-loss power allocation curve of the 10 kV AC~±375 V DC stage for example, the four piecewise points are respectively denoted as A, B, C, and D, and the total loads corresponding thereto are respectively denoted as LA, LB, LC, and LD. When the load x is between 0 and LA, operating only one of the two power electronic transformers, and shutting down the other one; when the load x is between LA and LB, evenly allocating power to the two power electronic transformers; when the load x is between LB and LC, allocating power f1(x) to one power electronic transformer wherein f1(x) is a fitted quartic polynomial function, and allocating power x−f1(x) to the other power electronic transformer; when the load x is between LC and LD, allocating power f2(x) to one power electronic transformer wherein f2(x) is a fitted quartic polynomial function, and allocating power x−f2(x) to the other power electronic transformer; and when the load x is between LD and LMAX, evenly allocating power to the two power electronic transformers, wherein LMAX represents a maximum operation power of each stage in the two parallel power electronic transformers.

Figure 7:
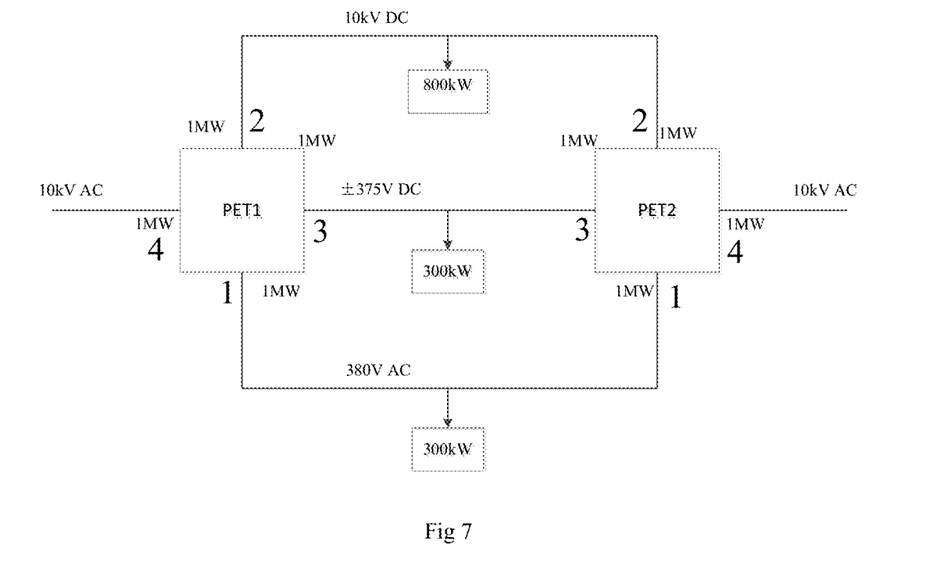
FIG. 7 shows a dual-parallel configuration and the load allocation of power electronic transformers in one embodiment of the present invention.
Figure 8:
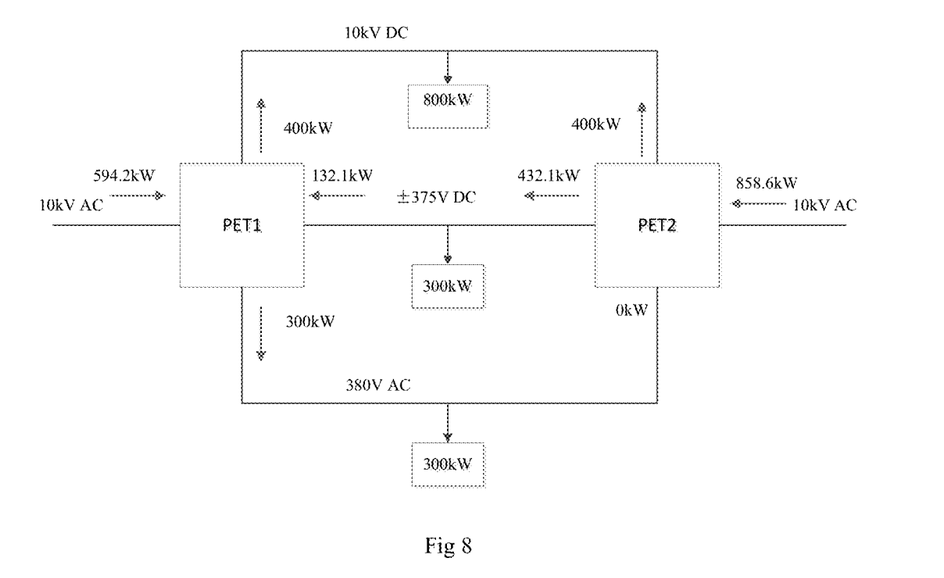
FIG. 8 shows a dual-parallel power optimization result of power electronic transformers in one embodiment of the present invention.

(6) Determining the optimum power allocation to each port of the dual-parallel four-port power electronic transformers in a sequence starting from the low-voltage bus. The dual-parallel configuration of the four-port power electronic transformers and the optimized power allocation to each port are as shown in FIG. 7, wherein the 10 kV AC port is connected to the utility grid, while the other three ports are connected to loads. The sequence for determining the optimum power allocation to each port is 380 V AC, 10 kV DC, ±375 V DC, and 10 kV AC. Based on the calculation results in step (5) and the load ratio-efficiency relationship of each stage, the power flow at each port is calculated, as shown in FIG. 8. If an operation strategy of evenly allocating the power is applied to the dual-parallel system of the four-port power electronic transformers, then the two power electronic transformers will both exhibit a loss of 29.6 kW; after the dual-parallel power allocation is optimized, then the losses of the two power electronic transformers will be 26.3 kW and 26.5 kW respectively.

Figure 10:
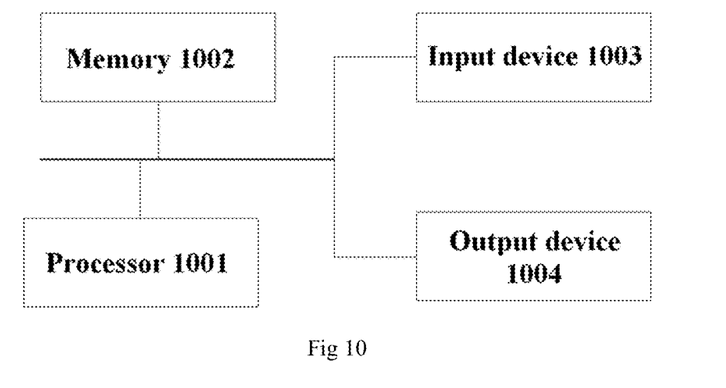
FIG. 10 shows a schematic diagram showing the hardware structure of an electronic device for power allocation of multi-parallel power electronic transformers according to the present invention.

FIG. 10 is a schematic diagram showing the hardware structure of an electronic device for power allocation of multi-parallel power electronic transformers according to the present invention, which comprises:

at least one processor 1001, and a memory 1002 communicatively connected to the at least one processor 1001, wherein, the memory 1002 stores instructions executable by the one processor, the instructions being executed by the at least one processor to enable the at least one processor to perform the following steps:

determining a quantity of conversion stages of the multi-parallel power electronic transformers, wherein each of the conversion stages comprises two ports;

obtaining a load ratio-efficiency relationship between the two ports of each conversion stage in turn, performing a curve fitting to obtain a load ratio-efficiency curve of each conversion stage of the multi-parallel power electronic transformers;

calculating a load ratio-loss relationship of each conversion stage, based on the load ratio-efficiency curve of each conversion stage;

obtaining a multi-parallel minimum-operation-loss power allocation curve of each conversion stage, based on the load ratio-loss relationship of each conversion stage;

performing a piecewise curve fitting of the minimum-operation-loss power allocation curve to obtain a multi-parallel optimum power allocation mathematical model of each stage;

determining an optimum power allocation to each port of the multi-parallel power electronic transformers, based on the multi-parallel optimum power allocation mathematical model of each stage.

In FIG. 10, an example is made wherein one processor 1002 is applied.

A server may also comprise an input device 1003 and an output device 1004.

The processor 1001, the memory 1002, the input device 1003 and the display device 1004 may be connected through a bus or via other means, and they are connected via a bus in the example of the figure.

The memory 1002, as a non-volatile computer readable storage medium, may be used for storing non-volatile software programs, non-volatile computer executable programs and modules, such as the programmed instructions/modules corresponding to the method for power allocation of multi-parallel power electronic transformers in this embodiment, e.g., the process as shown in FIG. 1.

By executing the non-volatile software programs, instructions and modules stored in the memory 1002, the processor 1001 performs various functional applications and data processing, that is, to implement the method for power allocation of multi-parallel power electronic transformers as described in the above embodiments.

The memory 1002 may comprise a program storage area and a data storage area, wherein, the program storage area may store an operating system and an application required for at least one function, and the data storage area may store data created according to the use of the method for power allocation of multi-parallel power electronic transformers. Moreover, the memory 1002 may comprise a high speed random access memory, and may also comprise a non-volatile memory such as at least one magnetic disk storage device, flash memory device, or other nonvolatile solid state storage device. In some embodiments, the memory 1002 may optionally include memories remotely disposed relative to the processor 1001, and these remote memories may be connected via the network to the device performing the method for power allocation of multi-parallel power electronic transformers. Examples of the above network include, but are not limited to, the Internet, intranet, local area network, mobile communication network, and combinations thereof.

The input device 1003 may receive inputted user clicks and generate signal inputs related to user settings and function control of the method for power allocation of multi-parallel power electronic transformers. The display device 1004 may include display equipment such as a display screen.

The one or more modules stored in the memory 1002, when they are executed by the one or more processor 1001, will perform the method for power allocation of multi-parallel power electronic transformers as described in the above embodiments.

In one embodiment, the step of obtaining the multi-parallel minimum-operation-loss power allocation curve of each conversion stage based on the load ratio-loss relationship of each conversion stage, comprises:

using the grid method to calculate total losses of each stage of the power electronic transformers in a multi-parallel operation under different loads;

selecting a plurality of specific loads, determining minimum total losses of each stage in the multi-parallel operation under the specific loads, calculating an optimum power allocation of each stage in the multi-parallel operation within a load range thereof to obtain the multi-parallel minimum-operation-loss power allocation curve of each stage.

In one embodiment, the multi-parallel optimum power allocation mathematical model is a dual-parallel optimum power allocation mathematical model, wherein the step of performing the piecewise curve fitting of the minimum-operation-loss power allocation curve to obtain the multi-parallel optimum power allocation mathematical model of each stage, comprises:

dividing the minimum-operation-loss power allocation curve of each stage in the multi-parallel configuration into a first curve segment, a second curve segment, a third curve segment, a fourth curve segment, and a fifth curve segment, wherein the first curve segment includes two apposed curve segments ranging from a minimum load to a first load jump point, the first jump point is a load point corresponding to an end of the apposed curve segments, the second curve segment includes a first connecting curve segment ranging from the first load jump point to a second load jump point, the second load jump point is a load point corresponding to a junction of the first connecting curve segment and an upper segment of an annular curve segment, the third curve segment includes the upper segment of the annular curve segment ranging from the second load jump point to a third load jump point, the third load jump point is a load point of the annular curve segment corresponding to a maximum x-value of a projection curve of the annular curve segment on a projection plane, the x-axis of the projection plane represents a power of one power electronic transformer, the y-axis of the projection plane represents a power of the other power electronic transformer, the fourth curve segment includes a lower segment of the annular curve segment ranging from the third load jump point to a fourth load jump point, the fourth load point is a load point corresponding to a junction of the lower segment of the annular curve segment and a second connecting curve segment, and the fifth curve segment includes the second connecting curve segment ranging from the fourth load point to a maximum load, and performing a curve fitting of a projection curve of the third curve segment on the projection plane and a projection curve of the fourth curve segment on the projection plane;

constructing the multi-parallel optimum power allocation mathematical model for each stage in two parallel power electronic transformers.

In one embodiment, the step of constructing the multi-parallel optimum power allocation mathematical model for each stage in the two parallel power electronic transformers, comprises:

constructing the multi-parallel optimum power allocation mathematical model for each stage in the two parallel power electronic transformers as follows:

when a total load x of the two parallel power electronic transformers is between the minimum load and the first load jump point LA, operating only one of the two power electronic transformers, and shutting down the other one; when the total load x of the two parallel power electronic transformers is between the first load jump point LA and the second load jump point LB, evenly allocating power to the two power electronic transformers; when the total load x of the two parallel power electronic transformers is between the second load jump point LB and the third load jump point LC, allocating power $f1(x)$ to one power electronic transformer wherein $f1(x)$ is a fitted polynomial function, and allocating power $x-f1(x)$ to the other power electronic transformer; when the total load x of the two parallel power electronic transformers is between the third load jump point LC and the fourth load jump point LD, allocating power $f2(x)$ to one power electronic transformer wherein $f2(x)$ is a fitted polynomial function, and allocating power $x-f2(x)$ to the other power electronic transformer; and when the total load x of the two parallel power electronic transformers is between the fourth load jump point LD and the maximum load LMAX, evenly allocating power to the two power electronic transformers, wherein LMAX represents a maximum operation power of each stage in the two parallel power electronic transformers.

In one embodiment, the step of determining the optimum power allocation to each port of the multi-parallel power electronic transformers based on the multi-parallel optimum power allocation mathematical model of each stage, comprises:

determining the optimum power allocation to each port of multi-parallel multi-port power electronic transformers in a sequence starting from the low-voltage bus, based on the multi-parallel optimum power allocation mathematical model of each stage.

The above-mentioned embodiments are merely illustrative of several embodiments of the present invention; though the description is relatively specific and detailed, it is not to be construed as limiting the scope of the invention. It should be noted that a number of variations and modifications may be made by those skilled in the art without departing from the spirit and scope of the invention. Therefore, the scope of the invention should be determined by the claims.

What is claimed is:

1. A method for power allocation of multi-parallel power electronic transformers, comprising steps of:

determining a quantity of conversion stages of the power electronic transformers, wherein each conversion stage comprises two ports;

obtaining a load ratio-efficiency relationship between the two ports of the each conversion stage in turn, performing a curve fitting to obtain a load ratio-efficiency curve of the each conversion stage of the power electronic transformers;

calculating a load ratio-loss relationship of the each conversion stage, based on the load ratio-efficiency curve of the each conversion stage;

obtaining a multi-parallel minimum-operation-loss power allocation curve of the each conversion stage, based on the load ratio-loss relationship of the each conversion stage;

performing a piecewise curve fitting of the minimum-operation-loss power allocation curve to obtain a multi-parallel optimum power allocation model of the each conversion stage; and determining an optimum power allocation to each port of the multi-parallel power electronic transformers, based on the multi-parallel optimum power allocation model of the each conversion stage;

wherein, the step of obtaining the multi-parallel minimum-operation-loss power allocation curve of each conversion stage based on the load ratio-loss relationship of the each conversion stage, comprises:

using a grid method to calculate total losses of the each conversion stage of the power electronic transformers in a multi-parallel operation under different loads; and selecting a plurality of specific loads, determining minimum total losses of the each conversion stage in the multi-parallel operation under the plurality of specific loads, calculating an optimum power allocation of the each conversion stage in the multi-parallel operation within a load range thereof to obtain the multi-parallel minimum-operation-loss power allocation curve of the each conversion stage.

2. The method for power allocation according to claim 1, wherein, the step of determining the optimum power allocation to each port of the multi-parallel power electronic transformers based on the multi-parallel optimum power allocation model of the each conversion stage, comprises:

determining the optimum power allocation to each port of multi-parallel multi-port power electronic transformers in a sequence starting from a low-voltage bus, based on the multi-parallel optimum power allocation model of the each conversion stage.

3. The method for power allocation according to claim 1, wherein, the multi-parallel optimum power allocation model is a dual-parallel optimum power allocation model, wherein the step of performing the piecewise curve fitting of the minimum-operation-loss power allocation curve to obtain the multi-parallel optimum power allocation model of the each conversion stage, comprises:

dividing the minimum-operation-loss power allocation curve of the each conversion stage in the multi-parallel configuration into a first curve segment, a second curve segment, a third curve segment, a fourth curve segment, and a fifth curve segment; wherein the first curve segment includes two apposed curve segments ranging from a minimum load to a first load jump point, the first jump point is a load point corresponding to an end of the apposed curve segments, the second curve segment includes a first connecting curve segment ranging from the first load jump point to a second load jump point, the second load jump point is a load point corresponding to a junction of the first connecting curve segment and an upper segment of an annular curve segment, the third curve segment includes the upper segment of the annular curve segment ranging from the second load jump point to a third load jump point, the third load jump point is a load point of the annular curve segment corresponding to a maximum x-value of a projection curve of the annular curve segment on a projection plane, an x-axis of the projection plane represents a power of one power electronic transformer, a y-axis of the projection plane represents a power of another power electronic transformer, the fourth curve segment includes a lower segment of the annular curve segment ranging from the third load jump point to a fourth load jump point, the fourth load point is a load point corresponding to a junction of the lower segment of the annular curve segment and a second connecting curve segment, and the fifth curve segment includes the second connecting curve segment ranging from the fourth load point to a maximum load, and performing a curve fitting of a projection curve of the third curve segment on the projection plane and a projection curve of the fourth curve segment on the projection plane; and     constructing the multi-parallel optimum power allocation model for the each conversion stage in two parallel power electronic transformers.

4. The method for power allocation according to claim 3, wherein, the step of constructing the multi-parallel optimum power allocation model for the each conversion stage in the two parallel power electronic transformers, comprises:

constructing the multi-parallel optimum power allocation model for the each conversion stage in the two parallel power electronic transformers as follows:

when a total load x of the two parallel power electronic transformers is between the minimum load and the first load jump point LA, operating only one of the two power electronic transformers, and shutting down the other one; when the total load x of the two parallel power electronic transformers is between the first load jump point LA and the second load jump point LB, evenly allocating power to the two power electronic transformers; when the total load x of the two parallel power electronic transformers is between the second load jump point LB and the third load jump point LC, allocating power $f1(x)$ to one power electronic transformer wherein $f1(x)$ is a fitted polynomial function, and allocating power $x-f1(x)$ to the other power electronic transformer; when the total load x of the two parallel power electronic transformers is between the third load jump point LC and the fourth load jump point LD, allocating power $f2(x)$ to one power electronic transformer wherein $f2(x)$ is a fitted polynomial function, and allocating power $x-f2(x)$ to the other power electronic transformer; and when the total load x of the two parallel power electronic transformers is between the fourth load jump point LD and the maximum load LMAX, evenly allocating power to the two power electronic transformers, wherein the LMAX represents a maximum operation power of the each conversion stage in the two parallel power electronic transformers.

5. The method for power allocation according to claim 4, wherein, the step of determining the optimum power allocation to each port of the multi-parallel power electronic transformers based on the multi-parallel optimum power allocation model of the each conversion stage, comprises:

determining the optimum power allocation to each port of multi-parallel multi-port power electronic transformers in a sequence starting from a low-voltage bus, based on the multi-parallel optimum power allocation model of the each conversion stage.

6. The method for power allocation according to claim 3, wherein, the step of determining the optimum power allocation to each port of the multi-parallel power electronic transformers based on the multi-parallel optimum power allocation model of the each conversion stage, comprises:

determining the optimum power allocation to each port of multi-parallel multi-port power electronic transformers in a sequence starting from a low-voltage bus, based on the multi-parallel optimum power allocation model of the each conversion stage.

7. An electronic device for power allocation of multi-parallel power electronic transformers, comprising:

at least one processor, and a memory communicatively connected to the at least one processor, wherein,     the memory stores instructions executable by the at least one processor, the instructions being executed by the at least one processor to enable the at least one processor to perform the following steps:

determining a quantity of conversion stages of the power electronic transformers, wherein each conversion stage comprises two ports;

obtaining a load ratio-efficiency relationship between the two ports of the each conversion stage in turn, performing a curve fitting to obtain a load ratio-efficiency curve of the each conversion stage of the power electronic transformers;

calculating a load ratio-loss relationship of the each conversion stage, based on the load ratio-efficiency curve of the each conversion stage;

obtaining a multi-parallel minimum-operation-loss power allocation curve of each conversion stage, based on the load ratio-loss relationship of the each conversion stage;

performing a piecewise curve fitting of the minimum-operation-loss power allocation curve to obtain a multi-parallel optimum power allocation model of the each conversion stage; and determining an optimum power allocation to each port of the multi-parallel power electronic transformers, based on the multi-parallel optimum power allocation model of the each conversion stage;

wherein, the step of obtaining the multi-parallel minimum-operation-loss power allocation curve of each conversion stage based on the load ratio-loss relationship of the each conversion stage, comprises:

using a grid method to calculate total losses of the each conversion stage of the power electronic transformers in a multi-parallel operation under different loads; and selecting a plurality of specific loads, determining minimum total losses of the each conversion stage in the multi-parallel operation under the plurality of specific loads, calculating an optimum power allocation of the each conversion stage in the multi-parallel operation within a load range thereof to obtain the multi-parallel minimum-operation-loss power allocation curve of the each conversion stage.

8. The device according to claim 7, wherein, the multi-parallel optimum power allocation model is a dual-parallel optimum power allocation model, wherein the step of performing the piecewise curve fitting of the minimum-operation-loss power allocation curve to obtain the multi-parallel optimum power allocation model of the each conversion stage, comprises:

dividing the minimum-operation-loss power allocation curve of the each conversion stage in the multi-parallel configuration into a first curve segment, a second curve segment, a third curve segment, a fourth curve segment, and a fifth curve segment; wherein the first curve segment includes two apposed curve segments ranging from a minimum load to a first load jump point, the first jump point is a load point corresponding to an end of the apposed curve segments, the second curve segment includes a first connecting curve segment ranging from the first load jump point to a second load jump point, the second load jump point is a load point corresponding to a junction of the first connecting curve segment and an upper segment of an annular curve segment, the third curve segment includes the upper segment of the annular curve segment ranging from the second load jump point to a third load jump point, the third load jump point is a load point of the annular curve segment corresponding to a maximum x-value of a projection curve of the annular curve segment on a projection plane, an x-axis of the projection plane represents a power of one power electronic transformer, a y-axis of the projection plane represents a power of another power electronic transformer, the fourth curve segment includes a lower segment of the annular curve segment ranging from the third load jump point to a fourth load jump point, the fourth load point is a load point corresponding to a junction of the lower segment of the annular curve segment and a second connecting curve segment, and the fifth curve segment includes the second connecting curve segment ranging from the fourth load point to a maximum load, and performing a curve fitting of a projection curve of the third curve segment on the projection plane and a projection curve of the fourth curve segment on the projection plane; and constructing the multi-parallel optimum power allocation model for the each conversion stage in two parallel power electronic transformers.

9. The device according to claim 8, wherein, the step of constructing the multi-parallel optimum power allocation model for the each conversion stage in the two parallel power electronic transformers, comprises:

constructing the multi-parallel optimum power allocation model for the each conversion stage in the two parallel power electronic transformers as follows:

when a total load x of the two parallel power electronic transformers is between the minimum load and the first load jump point LA, operating only one of the two power electronic transformers, and shutting down the other one; when the total load x of the two parallel power electronic transformers is between the first load jump point LA and the second load jump point LB, evenly allocating power to the two power electronic transformers; when the total load x of the two parallel power electronic transformers is between the second load jump point LB and the third load jump point LC, allocating power f1(x) to one power electronic transformer wherein f1(x) is a fitted polynomial function, and allocating power x-f1(x) to the other power electronic transformer; when the total load x of the two parallel power electronic transformers is between the third load jump point LC and the fourth load jump point LD, allocating power f2(x) to one power electronic transformer wherein f2(x) is a fitted polynomial function, and allocating power x-f2(x) to the other power electronic transformer; and when the total load x of the two parallel power electronic transformers is between the fourth load jump point LD and the maximum load LMAX, evenly allocating power to the two power electronic transformers, wherein the LMAX represents a maximum operation power of the each conversion stage in the two parallel power electronic transformers.

10. The device according to claim 9, wherein, the step of determining the optimum power allocation to each port of the multi-parallel power electronic transformers based on the multi-parallel optimum power allocation model of the each conversion stage, comprises:

determining the optimum power allocation to each port of multi-parallel multi-port power electronic transformers in a sequence starting from a low-voltage bus, based on the multi-parallel optimum power allocation model of the each conversion stage.

11. The device according to claim 8, wherein, the step of determining the optimum power allocation to each port of the multi-parallel power electronic transformers based on the multi-parallel optimum power allocation model of the each conversion stage, comprises:

determining the optimum power allocation to each port of multi-parallel multi-port power electronic transformers in a sequence starting from a low-voltage bus, based on the multi-parallel optimum power allocation model of the each conversion stage.

12. The device according to claim 7, wherein, the step of determining the optimum power allocation to each port of the multi-parallel power electronic transformers based on the multi-parallel optimum power allocation model of the each conversion stage, comprises:

determining the optimum power allocation to each port of multi-parallel multi-port power electronic transformers in a sequence starting from a low-voltage bus, based on the multi-parallel optimum power allocation model of the each conversion stage.

\* \* \* \* \*